(12) United States Patent
Yan (10) Patent No.: US 9,519,188 B2
(45) Date of Patent: Dec. 13, 2016

(54) LIQUID CRYSTAL ALIGNMENT FILM, METHOD FOR PREPARING THE SAME AND USE THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventor: Wei Yan, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 10 days.

(21) Appl. No.: 14/362,647

(22) PCT Filed: Jun. 28, 2013

(86) PCT No.: PCT/CN2013/078337
§ 371 (c)(1),
(2) Date: Jun. 4, 2014

(87) PCT Pub. No.: WO2014/146375
PCT Pub. Date: Sep. 25, 2014

(65) Prior Publication Data
US 2015/0286100 A1 Oct. 8, 2015

(30) Foreign Application Priority Data
Mar. 21, 2013 (CN) .......................... 2013 1 0092409

(51) Int. Cl.
| | | |
|---|---|---|
| C08G 18/42 | (2006.01) | |
| C08F 283/00 | (2006.01) | |
| C08G 65/48 | (2006.01) | |
| G02F 1/1337 | (2006.01) | |
| C09K 19/56 | (2006.01) | |

(52) U.S. Cl.
CPC ......... *G02F 1/133723* (2013.01); *C09K 19/56* (2013.01)

(58) Field of Classification Search
None
See application file for complete search history.

(56) References Cited

U.S. PATENT DOCUMENTS

| | | | | |
|---|---|---|---|---|
| 3,442,639 | A * | 5/1969 | Soper ............................. | 504/347 |
| 4,740,396 | A * | 4/1988 | Uekita ................. | B01D 69/122 |
| | | | | 427/430.1 |
| 5,046,822 | A * | 9/1991 | Matsuda ................ | C08G 73/10 |
| | | | | 349/124 |
| 2007/0036915 | A1* | 2/2007 | Kurosaki .......... | G02F 1/133711 |
| | | | | 428/1.2 |
| 2007/0265424 | A1* | 11/2007 | Whiteker ............... | C08G 73/10 |
| | | | | 528/368 |

OTHER PUBLICATIONS

Roberts, Langmuir-Blodgett Films, 1990, Springer Science + Business Media, LLC, p. 1-425.*
Full translation of Zhenhua et al. (CN 101085744), Fluorine-Containing Aromatic Diamine [SIC; Amino] Monomers and Method for Synthesizing Same, Dec. 12, 2007, p. 1-25.*
International Preliminary Report of Patentability, issued by the International Bureau of WIPO, in International Application No. PCT/CN2013/078337, dated Sep. 22, 2015; 7 pages.

* cited by examiner

*Primary Examiner* — Susannah Chung
*Assistant Examiner* — Robert T Butcher (57) ABSTRACT

A liquid crystal alignment film, a method for preparing the same and use thereof. The method for preparing the alignment film comprises the steps of: coating stearic acid onto a substrate; adding a polyamide acid salt solution to deionized water to allow the polyamide acid salt solution to form a stable film of a monomolecular layer on the surface of the deionized water; contacting the substrate coated with a layer of stearic acid horizontally with the monomolecular layer of the polyamide acid salt on the surface of the deionized water to form a monomolecular polyamide acid salt layer; and imidizing the monomolecular polyamide acid salt layer to form a monomolecular polyimide film.

14 Claims, 4 Drawing Sheets

Figure 7. IR spectrum of 1,4-bis(4-amino-2-trifluoromethylphenoxy)-2-(3', 5'-trifluoromethylphenyl)benzene Figure 8. IR spectrum of 1,4-bis(4-amino-2-trifluoromethylphenoxy)-2-(3'-methylphenyl)benzene

LIQUID CRYSTAL ALIGNMENT FILM, METHOD FOR PREPARING THE SAME AND USE THEREOF

CROSS REFERENCE TO RELATED APPLICATIONS

This application is based on International Application No. PCT/CN2013/078337 filed on Jun. 28, 2013, which claims priority to Chinese National Application No. 201310092409.6 filed on Mar. 21, 2013. The entire contents of each and every foregoing application are incorporated herein by reference.

TECHNICAL FIELD

Embodiments of the invention relate to a liquid crystal alignment film prepared by a monomolecular deposition process, the method for preparing the same and use thereof.

BACKGROUND

In a liquid crystal display, liquid crystal molecules must be aligned in a certain direction when they display patterns under an electric field. The alignment film coated on the inner surface of the liquid crystal cell can allow the liquid crystal molecules to arrange in order. The film-forming material is referred to the liquid crystal alignment film. Currently, the process for forming the liquid crystal alignment film in industry mainly comprises: 1. forming a film by using a APR (transfer) process; 2. forming a film by using inkjet spraying process. The two methods, however, are problematic in certain aspects. For example, the APR process needs an additional layout design, and the transfer will lead to considerable waste of the alignment film solution. The final film prepared by inkjet may have poor surface evenness and uniformity. The use of these alignment films from both processes is thus restricted to some extent. Furthermore, prior to dropping the liquid crystal, the above two film-forming processes will need a process of rubbing orientation to finally achieve an oriented anchoring of the liquid crystal molecules. It will cause some rubbing-related adverse effects, such as, particulate debris, rubbing mura, and so on.

Therefore, there exists a need in the art for a liquid crystal alignment film that has a uniform thickness and will be suitable for manufacturing liquid crystal alignment film articles shaped in a large area. Moreover, the liquid crystal molecules can be oriented after film-forming and before the dropping of the liquid crystal, without rubbing thereto.

SUMMARY

In an embodiment of the present invention, the monomolecular deposition process is introduced into the preparation of a liquid crystal alignment film. The amphiphilic molecules can arrange orderly in solution via deposition to form a film. The orderly arrangement of the film molecules can well orient the liquid crystal molecules, thereby omitting any rubbing process and avoiding the related adverse effects caused by such process. In addition, the monomolecular deposition process has an advantage in a large-area film forming and thus it is quite suitable for the large-area alignment film production of high-generation line.

An embodiment of the present invention provides a method for preparing a liquid crystal alignment film, comprising the steps of:

(1) coating stearic acid onto a substrate;
(2) adding a polyamide acid salt solution to deionized water, to allow the polyamide acid salt solution to form a stable film of a monomolecular layer on the surface of the deionized water;
(3) contacting the substrate coated with a layer of stearic acid horizontally with the monomolecular layer of the polyamide acid salt on the surface of the deionized water, to form a monomolecular polyamide acid salt layer, and
(4) imidizing the monomolecular polyamide acid salt layer to form a monomolecular polyimide film.

The method for preparing the liquid crystal alignment film according to the embodiment of the present invention further comprises:

prior to step (4), contacting the substrate with the monomolecular polyamide acid salt layer horizontally with the monomolecular layer of the polyamide acid salt on the surface of the deionized water, to form multiple monomolecular polyamide acid salt layers;

imidizing the multiple monomolecular polyamide acid salt layers to form multilayer monomolecular polyimide film.

Herein, the polyamide acid salt solution can be prepared by mixing a solution of polyamide acid in chloroform-N,N-dimethylacetamide with a solution of octadecyl aliphatic amine in chloroform-N,N-dimethylacetamide.

Herein, the ratio of chloroform to N,N-dimethylacetamide by volume can be in a range of from 3:1 to 4:1.

Herein, the polyamide acid can be prepared through the polymerization of aromatic tetracid dihydride with 1,4-bis(4-amino-2-trifluoromethylphenoxy)-2-(3'-trifluoromethylphenyl)benzene, 1,4-bis(4-amino-2-trifluoromethylphenoxy)-2-(3',5'-trifluoromethylphenyl)benzene, or 1,4-bis(4-amino-2-trifluoromethylphenoxy)-2-(3'-methylphenyl)benzene in m-cresol.

Herein, the aromatic tetracid dihydride can be 3,3',4,4'-diphenylether tetra-formic acid dihydride or 4,4'-hexafluoroisopropylidenyl-phthalic anhydride.

Herein, the molar ratio of the aromatic tetracid dihydride to 1,4-bis(4-amino-2-trifluoromethylphenoxy)-2-(3'-trifluoromethylphenyl)benzene, 1,4-bis(4-amino-2-trifluoromethylphenoxy)-2-(3',5'-trifluoromethylphenyl)benzene, or 1,4-bis(4-amino-2-trifluoromethylphenoxy)-2-(3'-methylphenyl)benzene can be in a range of from 3:4 to 8:9.

1,4-bis(4-amino-2-trifluoromethylphenoxy)-2-(3'-trifluoromethylphenyl)benzene can be prepared following the procedure, comprising:

reacting trifluoromethyl bisphenol with 2-chloro-5-nitro-3-trifluorotoluene in toluene in the presence of anhydrous potassium carbonate and DMF, to give a dinitro monomer; and allowing the dinitro monomer to react in an aqueous ethanol solution in the presence of Fe and hydrochloric acid (HCl), to yield 1,4-bis(4-amino-2-trifluoromethylphenoxy)-2-(3'-trifluoromethylphenyl)benzene.

Here, 1,4-bis(4-amino-2-trifluoromethylphenoxy)-2-(3',5'-trifluoromethylphenyl)benzene can be prepared following the procedure, comprising:

reacting 3-methylphenylbisphenol with 2-chloro-5-nitro-3-trifluorotoluene in toluene in the presence of anhydrous potassium carbonate and DMF, to give a dinitro monomer; and allowing the dinitro monomer to react in an aqueous ethanol solution in the presence of Fe and hydrochloric acid (HCl), to yield 1,4-bis(4-amino-2-trifluoromethylphenoxy)-2-(3',5'-trifluoromethylphenyl)benzene.

Here, 1,4-bis(4-amino-2-trifluoromethylphenoxy)-2-(3'-methylphenyl)benzene can be prepared following the procedure, comprising:

reacting 3,5-bis(trifluoromethyl)phenylbisphenol with 2-chloro-5-nitro-3-trifluorotoluene in toluene in the presence of anhydrous potassium carbonate and DMF, to give a dinitro monomer; and allowing the dinitro monomer to react in an aqueous ethanol solution in the presence of Fe and hydrochloric acid (HCl), to yield 1,4-bis(4-amino-2-trifluoromethylphenoxy)-2-(3'-methylphenyl)benzene.

The molar ratio of trifluoromethylbisphenol to 2-chloro-5-nitro-3-trifluorotoluene is 1:2.

The molar ratio of 3-methylphenylbisphenol to 2-chloro-5-nitro-3-trifluorotoluene is 1:2.

The molar ratio of 3.5-bis(trifluoromethyl)phenylbisphenol to 2-chloro-5-nitro-3-trifluorotoluene is 1:2.

The molar ratio of the dinitro monomer to Fe is 1:12.

The aqueous ethanol solution is at 50% by volume.

An embodiment of the present invention provides a liquid crystal alignment film.

The liquid crystal alignment film according to the embodiment of the present invention is formed by at least one layer of monomolecular polyimide film.

An embodiment of the present invention provides a display substrate.

The display substrate according to the embodiment of the present invention comprises the aforesaid liquid crystal alignment film.

BRIEF DESCRIPTION OF THE DRAWINGS

The figures useful for the examples will be simply described in order to illustrate the embodiments of the present invention more clearly. It is apparent that the described figures represent only a portion of the examples of the present invention. Based on these figures, persons of ordinary skill in the art can obtain other figures without creative work.

DETAILED DESCRIPTION

The embodiments of the present invention will be described clearly and completely hereinafter. It is apparent that the described embodiments represent only a portion of, rather than all of the embodiments of the present invention. Based on the embodiments of the present invention, persons of ordinary skill in the art can obtain other embodiments without creative work, all of which are encompassed within the scope of the present invention.

Definition of Amphiphilic Molecules

The liquid crystal alignment film of the present disclosure can be prepared by Longmuir-Blodgott (LB) film technique. The molecule forming a LB film comprises amphiphilic groups in structure, i.e., a hydrophilic group and a hydrophobic group, wherein, the hydrophilic group comprises —COOH, —OH, and the like, and the hydrophobic group comprises alkyl, aryl, and the like. Such molecule containing both a hydrophilic group and a hydrophobic group is referred to as "amphiphilic molecules". If a molecule contains both a hydrophilic group and a hydrophobic group with the ratio thereof in a proper range in its structure, a monomolecular deposition film (i.e., LB film) can be formed on the interface of two-phase solution, wherein, the hydrophilic group is at the side of water, and the hydrophobic is at the side of air.

The LB film is prepared by dissolving amphiphilic molecules useful for film-forming in a volatile solvent and dripping the solution on the surface of water to form a monomolecular layer of film-forming molecules. Certain pressure is then applied to the layer to create a highly ordered and compactly arranged monomolecular layer depending on the self-assembly capability of the film-forming molecules. The process can be repeated according to the desired thickness of the liquid crystal alignment film, to yield liquid crystal alignment films having different film thickness.

An embodiment of the present invention provides a method for preparing a liquid crystal alignment film, comprising the steps of:

(1) coating stearic acid onto a substrate;

(2) adding a polyamide acid salt solution to deionized water, to allow the polyamide acid salt solution to form a stable film of a monomolecular layer on the surface of the deionized water;

(3) contacting the substrate coated with a layer of stearic acid horizontally with the monomolecular layer of the polyamide acid salt on the surface of the deionized water, to form a monomolecular polyamide acid salt layer; and (4) imidizing the monomolecular polyamide acid salt layer to form a monomolecular polyimide film.

The method for preparing the liquid crystal alignment film according to the embodiment of the present invention further comprises:

prior to step (4), contacting the substrate with the monomolecular polyamide acid salt layer horizontally with the monomolecular layer of the polyamide acid salt on the surface of the deionized water, to form multiple monomolecular polyamide acid salt layers;

imidizing the multiple monomolecular polyamide acid salt layers to form multilayer monomolecular polyimide film.

Herein, the polyamide acid salt solution can be prepared by mixing a solution of polyamide acid in chloroform-N,N-dimethylacetamide with a solution of octadecyl aliphatic amine in chloroform-N,N-dimethylacetamide.

Herein, the ratio of chloroform to N,N-dimethylacetamide by volume can be in a range of from 3:1 to 4:1.

Herein, the polyamide acid can be prepared through the polymerization of aromatic tetracid dihydride with 1,4-bis(4-amino-2-trifluoromethylphenoxy)-2-(3'-trifluoromethylphenyl)benzene, 1,4-bis(4-amino-2-trifluoromethylphenoxy)-2-(3',5'-trifluoromethylphenyl)benzene, or 1,4-bis(4-amino-2-trifluoromethylphenoxy)-2-(3'-methylphenyl) benzene in m-cresol.

Herein, the aromatic tetracid dihydride can be 3,3',4,4'-diphenylether tetra-formic acid dihydride or 4,4'-hexafluoroisopropylidenyl-phthalic anhydride.

Herein, the molar ratio of the aromatic tetracid dihydride to 1,4-bis(4-amino-2-trifluoromethylphenoxy)-2-(3'-trifluoromethylphenyl)benzene, 1,4-bis(4-amino-2-trifluoromethylphenoxy)-2-(3',5'-trifluoromethylphenyl)benzene, or 1,4-bis(4-amino-2-trifluoromethylphenoxy)-2-(3'-methylphenyl)benzene can be in a range of from 3:4 to 8:9.

1,4-bis(4-amino-2-trifluoromethylphenoxy)-2-(3'-trifluoromethylphenyl)benzene can be prepared following the procedure, comprising:
  reacting trifluoromethyl bisphenol with 2-chloro-5-nitro-3-trifluorotoluene in toluene in the presence of anhydrous potassium carbonate and DMF, to give a dinitro monomer; and
  allowing the dinitro monomer to react in an aqueous ethanol solution in the presence of Fe and hydrochloric acid (HCl), to yield 1,4-bis(4-amino-2-trifluoromethylphenoxy)-2-(3'-trifluoromethylphenyl)benzene.

Here, 1,4-bis(4-amino-2-trifluoromethylphenoxy)-2-(3',5'-trifluoromethylphenyl)benzene can be prepared following the procedure, comprising:
  reacting 3-methylphenylbisphenol with 2-chloro-5-nitro-3-trifluorotoluene in toluene in the presence of anhydrous potassium carbonate and DMF, to give a dinitro monomer; and
  allowing the dinitro monomer to react in an aqueous ethanol solution in the presence of Fe and hydrochloric acid (HCl), to yield 1,4-bis(4-amino-2-trifluoromethylphenoxy)-2-(3',5'-trifluoromethylphenyl)benzene.

Here, 1,4-bis(4-amino-2-trifluoromethylphenoxy)-2-(3'-methylphenyl)benzene can be prepared following the procedure, comprising:
  reacting 3.5-bis(trifluoromethyl)phenylbisphenol with 2-chloro-5-nitro-3-trifluorotoluene in toluene in the presence of anhydrous potassium carbonate and DMF, to give a dinitro monomer; and
  allowing the dinitro monomer to react in an aqueous ethanol solution in the presence of Fe and hydrochloric acid (HCl), to yield 1,4-bis(4-amino-2-trifluoromethylphenoxy)-2-(3'-methylphenyl)benzene.

The molar ratio of trifluoromethylbisphenol to 2-chloro-5-nitro-3-trifluorotoluene is 1:2.

The molar ratio of 3-methylphenylbisphenol to 2-chloro-5-nitro-3-trifluorotoluene is 1:2.

The molar ratio of 3.5-bis(trifluoromethyl)phenylbisphenol to 2-chloro-5-nitro-3-trifluorotoluene is 1:2.

The molar ratio of the dinitro monomer to Fe is 1:12.

The aqueous ethanol solution is at 50% by volume.

The method for preparing the liquid crystal alignment film according to the embodiments of the present invention, utilizes monomolecular deposition to form the film, as compared to previous APR transfer process and inkjet spraying process. The monomolecular deposition method can prepare an alignment film having an even and uniform surface with sufficient area. The monomolecular deposition method can achieve the alignment of the liquid crystal molecules through regular arrangement from molecule deposition, without the need of rubbing orientation, thereby maximally avoiding the occurrence of rubbing-related adverse effects. Moreover, with monomolecular deposition process, the film thickness can be adjusted by controlling the numbers of deposition layers, such that a liquid crystal alignment film having a desired thickness can be created as necessary.

The preparation of a diamine monomer intermediate will be described hereinafter.

PREPARATION EXAMPLE 1

Preparation of a Diamine Monomer, 1,4-bis(4-amino-2-trifluoromethylphenoxy)-2-(3'-trifluoromethylphenyl)benzene The procedure for preparing the intermediate 1,4-bis(4-amino-2-trifluoromethylphenoxy)-2-(3'-trifluoromethylphenyl)benzene used in the following example is described below.

Preparation of a Dinitro Monomer.

To a 1000 ml three-neck flask equipped with a mechanical stirrer, a nitrogen inlet, a Dean-Stark trap, and a reflux condenser were added trifluoromethylbisphenol (0.2 mol, 50.84 g) (trifluoromethylbisphenol was prepared following the procedure as described in Liu B J, Wang G B, Hu W, Jin Y H, Chen C H, Jiang Z H, et al. J Polym Sci Part A Polym Chem 2002; 40:3392), 2-chloro-5-nitro-3-trifluorotoluene (0.4 mol, 90.22 g) (AR, Shanghai Shandao Co., LTD), anhydrous potassium carbonate (0.24 mol, 33.12 g) (AR, Tianjin Chemical Regent Factory), DMF (500 ml) (AR, Tiantai Fine Chemical Co., LTD, Tianjin), and toluene (70 ml). The mixture was heated to allow toluene refluxing at 130° C. for 4 hr. The reaction was heated to 150° C. to remove toluene by evaporation, and continued for 8 hr. The reaction temperature was further adjusted to 160-170° C., and the reaction was continued for 4 hr. The crude was poured into distilled water, and sufficiently washed with ethanol (AR, Beijing Chemical Factory) and deionized water. The product was dried at a temperature of 120° C. in an oven for 12 hr, to give 96.16 g of a dinitro monomer in yellow powdered solid.

Preparation of a Diamine Monomer.

In a 250 ml three-neck flask were placed and refluxed the dinitro monomer prepared above (0.02 mol, 12.65 g), Fe powders (0.24 mol, 13.44 g) (AR, Beijing Chemical Regent Factory), and 50 vol % of an aqueous ethanol solution (60 ml). 0.704 ml of a concentrated HCl solution (AR, Beijing Chemical Regent Factory, 36.5 vol %) and 10 ml of 50 vol % of an aqueous ethanol solution were added dropwise during the refluxing and the reaction was continued for 3 hr. 0.366 g of NaOH was added to neutralize the extra unreacted HCl. The mixed solution was heat-filtered and the filtrate was cooled under nitrogen protection until the diamine monomer was precipitated. The crude was recrystallized by using ethanol to give 8.5 g of the diamine monomer, 1,4-bis(4-amino-2-trifluoromethylphenoxy)-2-(3'-trifluoromethylphenyl)benzene.

Figure 4:
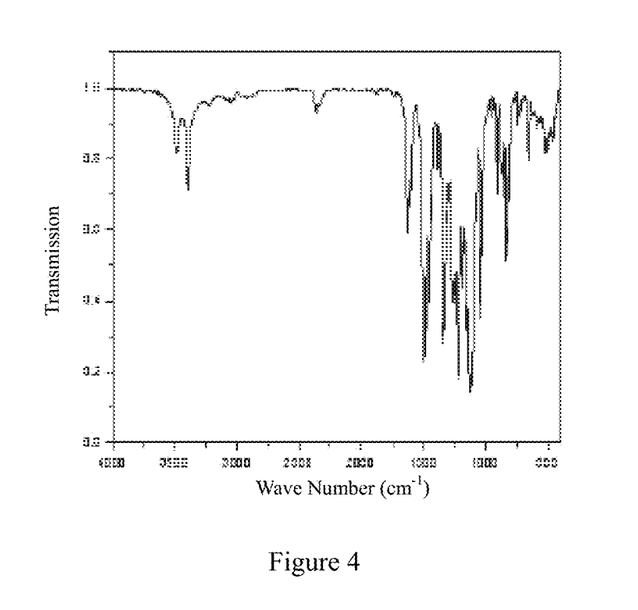
FIG. 4 shows the IR spectrum of 1,4-bis(4-amino-2-trifluoromethylphenoxy)-2-(3'-trifluoromethylphenyl)benzene.

The reaction scheme is as follow:

The result from IR analysis of the product was shown in FIG. 4.

IR spectrum: IR (KBr, cm$^{-1}$): 3472 and 3382 (N—H stretching vibration absorption peak), 1238 (Ph-O-Ph vibration absorption peak), 1131 (C—F vibration absorption peak).

The result characterized by IR indicated that the resulting product was 1,4-bis(4-amino-2-trifluoromethylphenoxy)-2-(3'-trifluoromethylphenyl)benzene.

PREPARATION EXAMPLE 2

Preparation of a diamine Monomer, 1,4-bis(4-amino-2-trifluoromethylphenoxy)-2-(3',5'-trifluoromethylphenyl)benzene The procedure is described below.
Preparation of a Dinitro Monomer.

To a 1000 ml three-neck flask equipped with a mechanical stirrer, a nitrogen inlet, a Dean-Stark trap, and a reflux condenser were added 3-methylphenylbisphenol (0.2 mol), 2-chloro-5-nitro-3-trifluorotoluene (0.4 mol, 90.22 g) (AR, Shanghai Shandao Co., LTD), anhydrous potassium carbonate (0.24 mol, 33.12 g) (AR, Tianjin Chemical Regent Factory), DMF (500 ml) (AR, Tiantai Fine Chemical Co., LTD, Tianjin), and toluene (70 ml). The mixture was heated to allow toluene refluxing at 130° C. for 4 hr. The reaction was heated to 150° C. to remove toluene by evaporation, and continued for 8 hr. The reaction temperature was further adjusted to 160-170° C., and the reaction was continued for 4 hr. The crude was poured into distilled water, and sufficiently washed with ethanol (AR, Beijing Chemical Factory) and deionized water. The product was dried at a temperature of 120° C. in an oven for 12 hr, to give 96.16 g of a dinitro monomer in yellow powdered solid.

Preparation of a Diamine Monomer.

In a 250 ml three-neck flask were placed and refluxed the dinitro monomer prepared above (0.02 mol), Fe powders (0.24 mol, 13.44 g) (AR, Beijing Chemical Regent Factory), and 50 vol % of an aqueous ethanol solution (60 ml). 0.704 ml of a concentrated HCl solution (AR, Beijing Chemical Regent Factory, 36.5 vol %) and 10 ml of 50 vol % of an aqueous ethanol solution were added dropwise during the refluxing and the reaction was continued for 3 hr. 0.366 g of NaOH was added to neutralize the extra unreacted HCl. The mixed solution was heat-filtered and the filtrate was cooled under nitrogen protection until the diamine monomer was precipitated. The crude was recrystallized by using ethanol to give the diamine monomer, 1,4-bis(4-amino-2-trifluoromethylphenoxy)-2-(3',5'-trifluoromethylphenyl)benzene.

Figure 7:
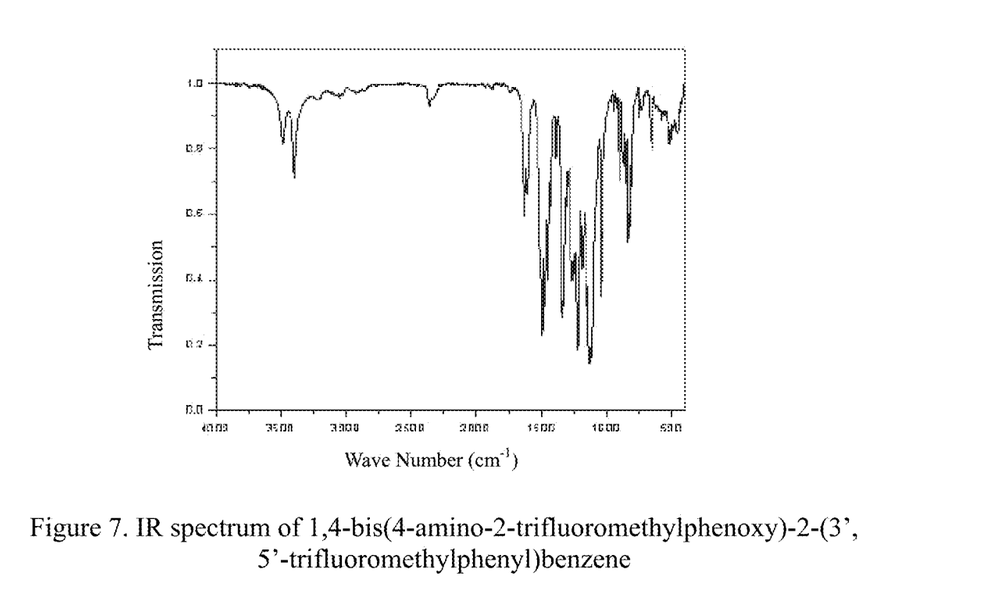
FIG. 7 shows the IR spectrum of 1,4-bis(4-amino-2-trifluoromethylphenoxy)-2-(3',5'-trifluoromethylphenyl)benzene.
Figure 8:
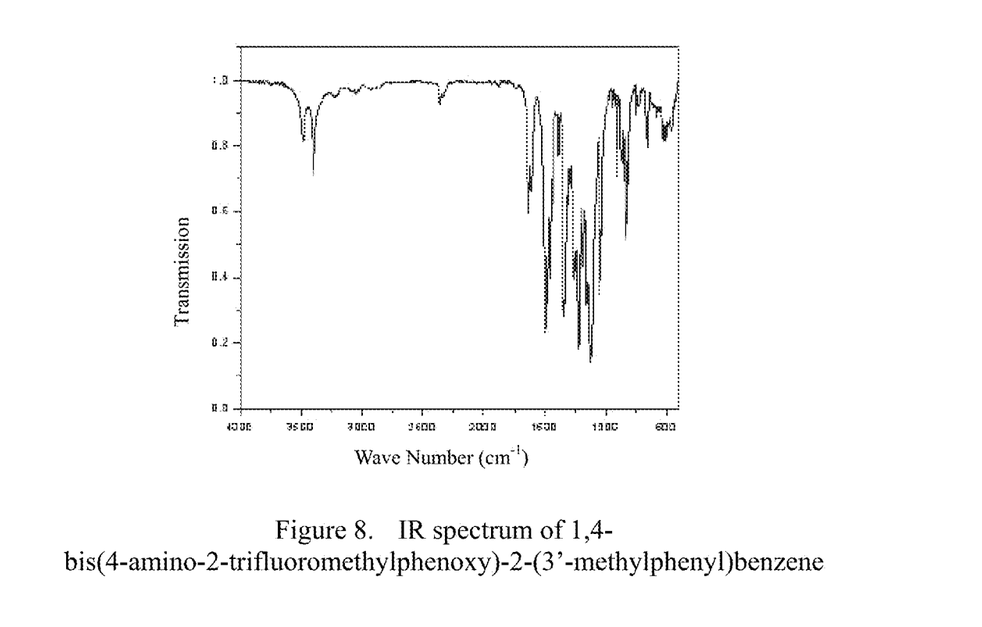
FIG. 8 shows the IR spectrum of 1,4-bis(4-amino-2-trifluoromethylphenoxy)-2-(3'-methylphenyl)benzene.

The result from IR analysis of the product was shown in FIG. 7.

IR spectrum: IR (KBr, cm$^{-1}$): 3472 and 3382 (N—H stretching vibration absorption peak), 1234 (Ph-O-Ph vibration absorption peak), 1135 (C—F vibration absorption peak).

The result characterized by IR indicated that the resulting product was 1,4-bis(4-amino-2-trifluoromethylphenoxy)-2-(3',5'-trifluoromethylphenyl)benzene.

PREPARATION EXAMPLE 3

Preparation of a Diamine Monomer, 1,4-bis(4-amino-2-trifluoromethylphenoxy)-2-(3'-methylphenyl)benzene The procedure is described below.
Preparation of a Dinitro Monomer.

To a 1000 ml three-neck flask equipped with a mechanical stirrer, a nitrogen inlet, a Dean-Stark trap, and a reflux condenser were added 3,5-bis(trifluoromethyl)phenylbisphenol (0.2 mol), 2-chloro-5-nitro-3-trifluorotoluene (0.4 mol, 90.22 g) (AR, Shanghai Shandao Co., LTD), anhydrous potassium carbonate (0.24 mol, 33.12 g) (AR, Tianjin Chemical Regent Factory), DMF (500 ml) (AR, Tiantai Fine Chemical Co., LTD, Tianjin), and toluene (70 ml). The mixture was heated to allow toluene refluxing at 130° C. for 4 hr. The reaction was heated to 150° C. to remove toluene by evaporation, and continued for 8 hr. The reaction temperature was further adjusted to 160-170° C., and the reaction was continued for 4 hr. The crude was poured into distilled water, and sufficiently washed with ethanol (AR, Beijing Chemical Factory) and deionized water. The product was dried at a temperature of 120° C. in an oven for 12 hr, to give 96.16 g of a dinitro monomer in yellow powdered solid.

Preparation of a Diamine Monomer.

In a 250 ml three-neck flask were placed and refluxed the dinitro monomer prepared above (0.02 mol), Fe powders (0.24 mol, 13.44 g) (AR, Beijing Chemical Regent Factory), and 50 vol % of an aqueous ethanol solution (60 ml). 0.704 ml of a concentrated HCl solution (AR, Beijing Chemical Regent Factory, 36.5 vol %) and 10 ml of 50 vol % of an aqueous ethanol solution were added dropwise during the refluxing and the reaction was continued for 3 hr. 0.366 g of NaOH was added to neutralize the extra unreacted HCl. The mixed solution was heat-filtered and the filtrate was cooled under nitrogen protection until the diamine monomer was precipitated. The crude was recrystallized by using ethanol to give the diamine monomer, 1,4-bis(4-amino-2-trifluoromethylphenoxy)-2-(3'-methylphenyl)benzene.

The result from IR analysis of the product was shown in FIG. 7.

IR spectrum: IR (KBr, cm$^{-1}$): 3490 and 3398 (C—H, N—H stretching vibration absorption peaks), 1239 (Ph-O-Ph vibration absorption peak).

The result characterized by IR indicated that the resulting product was 1,4-bis(4-amino-2-trifluoromethylphenoxy)-2-(3'-methylphenyl)benzene.

The preparation of the liquid crystal alignment film of the present disclosure is illustrated with reference to the following examples. These examples are only illustrative, and should not be interpreted as limiting the scope of the present disclosure.

EXAMPLE 1

To a 100 ml three-neck flask equipped with a mechanical stirrer, a nitrogen inlet, and a reflux condenser were added 3,3',4,4'-3,3',4,4'-diphenylether tetra-formic acid dihydride (ODPA) (0.4653 g, 0.003 mol) (AR, sigma-aldrich), 1,4-bis(4-amino-2-trifluoromethylphenoxy)-2-(3'-trifluoromethylphenyl)benzene prepared above (1.1448 g, 0.004 mol), and metacresol (10 ml) (AR, Changzhou Xinhua active material Co., LTD). The mixture was stirred for 10 hr accompanied by introduction of nitrogen, to give polyamide acid. The resulting polyamide acid was formulated into a solution at a concentration of 1 mmol/L in a mixed solvent of chloroform and N,N-dimethylacetamide (4:1 by volume), and octadecyl aliphatic amine was also formulated into a solution at the same concentration in the same solvent system. Both solutions were mixed to form a polyamide acid salt solution.

Figure 1:
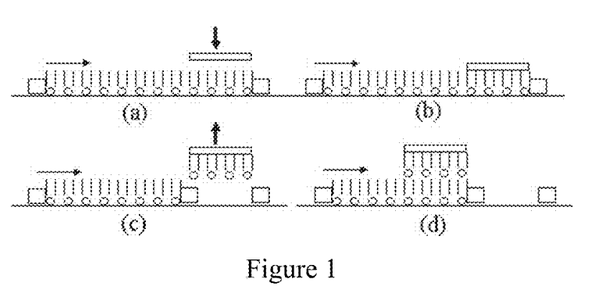
FIG. 1 shows a schematic process for preparing a polyimide alignment film.

The LB film was prepared as follows:
(1) adding the resulting polyamide acid salt solution to deionized water, to allow it to form a stable film of monomolecular layer, as shown in FIG. 1(a);
(2) coating a layer of stearic acid on a glass substrate, and contacting it horizontally with the film of the monomolecular layer on the surface of the liquid, as shown in FIG. 1(b); at the same time, placing a baffle at both sides of the solid slide and pulling the glass substrate to create a layer of pulled monomolecular film as shown in FIG. 1(c);
(3) repeating step (2), from which a further layer of monomolecular film can be transferred onto the glass substrate, thereby forming a film structure having a certain thickness and orientation, as shown in FIG. 1(d);
(4) imidizing the glass substrate loaded with the polyamide acid salt film via heating, to produce a final polyimide alignment film having certain film morphology. The heating conditions for imidizing are well known by persons skilled in the art. The polyimide alignment film has a thickness of about 0.45 nm. The process can be repeated to achieve the films having different thickness as necessary, such as 800 Å, 1200 Å, and so on.

Figure 2:
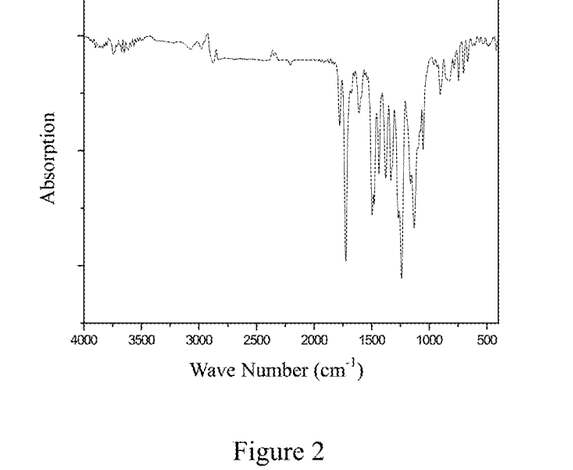
FIG. 2 shows the IR spectrum of the polyimide alignment film prepared in Example 1.
Figure 3:
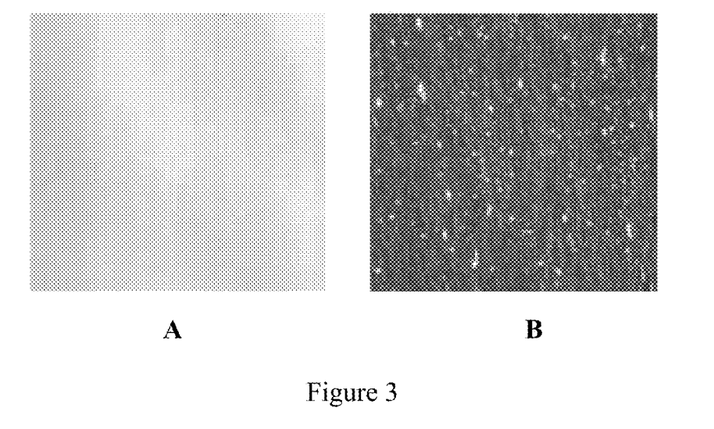
FIG. 3 show the surface morphology of the polyimide alignment film prepared in Example 1.

The polyimide alignment film has a surface morphology as shown in FIG. 3A. The prior liquid crystal alignment film obtained upon rubbing orientation has a surface morphology as shown in FIG. 3B. The comparison results from FIG. 3 show that the alignment film produced by the monomolecular deposition process has a surface morphology that is almost undestroyed, and will not cause an adverse effect, such as rubbed particle debris, without the need of a rubbing process The result from IR (Nicolet Impat Model 410, Fourier Transform Infrared Spectrometer) analysis of the resulting polyimide is shown in FIG. 2, in which, the absorption peaks at 1780 cm$^{-1}$, 1726 cm$^{-1}$ correspond to C=O; the absorption peak at 1363 cm$^{-1}$ corresponds to C—N; the absorption peaks at 1320 cm$^{-1}$, 1136 cm$^{-1}$ correspond to —CF. It can be seen from FIG. 2 that there is no absorption peak for amino in the range of 3200-3600 cm$^{-1}$, indicating a complete cyclization of the polymer.

EXAMPLE 2

To a 100 ml three-neck flask equipped with a mechanical stirrer, a nitrogen inlet, and a reflux condenser were added 4,4'-hexafluoroisopropylidenyl-phthalic anhydride (6FDA) (3.5539 g, 0.008 mol) (AR, sigma-aldrich), 1,4-bis(4-amino-2-trifluoromethylphenoxy)-2-(3'-trifluoromethylphenyl)benzene prepared above (2.5758 g, 0.009 mol), and metacresol (10 ml) (AR, Changzhou Xinhua active material Co., LTD). The mixture was stirred for 10 hr accompanied by introduction of nitrogen, to give polyamide acid. The resulting polyamide acid was formulated into a solution at a concentration of 1 mmol/L in a mixed solvent of chloroform and N,N-dimethylacetamide (3:1 by volume), and octadecyl aliphatic amine was also formulated into a solution at the same concentration in the same solvent system. Both solutions were mixed to form a polyamide acid salt solution.

A polyimide alignment film was prepared following the same procedure as described in Example 1.

Figure 5:
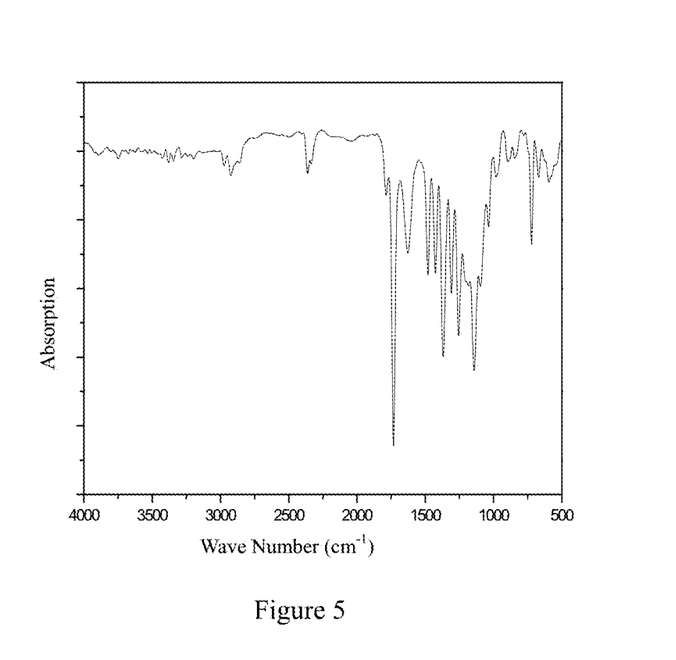
FIG. 5 shows the IR spectrum of the polyimide alignment film prepared in Example 2.
Figure 6:
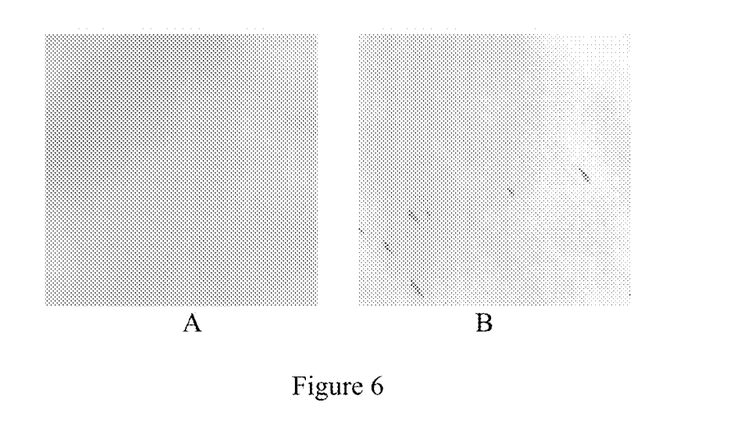
FIG. 6 show the surface morphology of the polyimide alignment film prepared in Example 2.

The polyimide alignment film has a surface morphology as shown in FIG. 6A. The prior liquid crystal alignment film obtained upon rubbing orientation has a surface morphology as shown in FIG. 6B. The comparison results from FIG. 6 show that the alignment film produced by the monomolecular deposition process has a surface morphology that is almost undestroyed, and will not cause an adverse effect, such as rubbed particle debris, without the need of a rubbing process The result from IR (Nicolet Impat Model 410, Fourier Transform Infrared Spectrometer) analysis of the resulting polyimide is shown in FIG. 5, in which, the absorption peaks at 1780 cm$^{-1}$, 1726 cm$^{-1}$ correspond to C=O; the absorption peak at 1363 cm$^{-1}$ corresponds to C—N; the absorption peaks at 1320 cm$^{-1}$, 1136 cm$^{-1}$ correspond to —CF. It can be seen from FIG. 5 that there is no absorption peak for amino in the range of 3200-3600 cm$^{-1}$, indicating a complete cyclization of the polymer.

Following the same procedure and regents as in Example 1, 3,3',4,4'-3,3',4,4'-diphenylether tetra-formic acid dihydride was reacted with 1,4-bis(4-amino-2-trifluoromethylphenoxy)-2-(3',5'-trifluoromethylphenyl)benzene prepared in Preparation Example 2, 1,4-bis(4-amino-2-trifluoromethylphenoxy)-2-(3'-methylphenyl)benzene prepared in Preparation Example 3, respectively, to produce two polyimide alignment films. The specific description is thus omitted here.

Following the same procedure and regents as in Example 2, 4,4'-hexafluoroisopropylidenyl-phthalic anhydride was reacted with 1,4-bis(4-amino-2-trifluoromethylphenoxy)-2-(3',5'-trifluoromethylphenyl)benzene prepared in Preparation Example 2, 1,4-bis(4-amino-2-trifluoromethylphenoxy)-2-(3'-methylphenyl)benzene prepared in Preparation Example 3, respectively, to produce two polyimide alignment films. The specific description is thus omitted here.

The embodiments of the present invention, by introducing the monomolecular deposition process into the preparation of a liquid crystal alignment film, achieve advantage over the prior art. The amphiphilic molecules can arrange orderly in solution via deposition to form a film. The orderly arrangement of the film molecules can well orient the liquid crystal molecules, thereby omitting any rubbing process and avoiding the related adverse effects caused by such process. In addition, the monomolecular deposition process has an advantage in a large-area film forming and thus it is quite suitable for the large-area alignment film production of high-generation line.

The above description is only illustrative, rather than limiting thereto. It should be understood that person of ordinary skill in the art can make various modifications, variations, or equivalents thereof to the present invention without departing from the spirit and scope of the present invention, all of which will fall within the scope of the appended claims.

The invention claimed is:

1. A method for preparing a liquid crystal alignment film, comprising the steps of:
   (1) coating stearic acid onto a substrate;
   (2) adding a polyamide acid salt solution to deionized water, to allow the polyamide acid salt solution to form a stable film of a monomolecular layer on the surface of the deionized water;
   (3) contacting the substrate coated with a layer of stearic acid horizontally with the monomolecular layer of the polyamide acid salt on the surface of the deionized water, to form a monomolecular polyamide acid salt layer; and
   (4) imidizing the monomolecular polyamide acid salt layer to form a monomolecular polyimide film, wherein the polyamide acid salt solution is prepared by mixing a solution of polyamide acid in chloroform and N,N-dimethylacetamide with a solution of octadecyl aliphatic amine in chloroform and N,N-dimethylacetamide,
   wherein the polyamide acid is prepared through the polymerization of aromatic tetracid dianhydride with a monomer selected from 1,4-bis(4-amino-2-trifluoromethylphenoxy)-2-(3'-trifluoromethyl phenyl)benzene, 1,4-bis(4-amino-2-trifluoromethylphenoxy)-2-(3',5'-trifluoromethyl phenyl)benzene, or 1,4-bis(4-amino-2-trifluoromethylphenoxy)-2-(3'-methylphenyl)benzene in m-cresol, the aromatic tetracid dianhydride being 3,3',4,4'-diphenylether tetracarboxylic acid dianhydride or 4,4'-hexafluoroisopropylidenyl-phthalic anhydride, and
   wherein the molar of the aromatic tetracid dianhydride to a monomer selected from 1,4-bis(4-amino-2-trifluoromethylphenoxy)-2-(3'-trifluoromethylphenyl)benzene1,4-bis(4-amino-2-trifluoromethyl phenoxy)-2-(3',5'-trifluoromethylphenyl)benzene, or 1,4-bis(4-amino-2-trifluoromethyl phenoxy)-2-(3'-methylphenyl)benzene is in a range of from 3:4 to 8:9.

2. The method of claim 1, wherein the method further comprises: prior to the step (4), contacting the substrate with the monomolecular polyamide acid salt layer horizontally with the monomolecular layer of the polyamide acid salt on the surface of the deionized water, to form multiple monomolecular polyamide acid salt layers; and imidizing the multiple monomolecular polyamide acid salt layers to form multilayer monomolecular polyimide film.

3. The method of claim 1, wherein the ratio of chloroform to N,N-dimethylacetamide by volume is in a range of from 3:1 to 4:1.

4. The method of claim 1, wherein the 1,4-bis(4-amino-2-trifluoromethylphenoxy)-2-(3'-trifluoromethylphenyl) benzene is prepared following the procedure, comprising: reacting trifluoromethyl bisphenol with 2-chloro-5-nitro-3-trifluorotoluene in toluene in the presence of anhydrous potassium carbonate and N,N-dimethylformamide, to give a dinitro monomer; and allowing the dinitro monomer to react in an aqueous ethanol solution in the presence of Fe and hydrochloric acid, to yield 1,4-bis(4-amino-2-trifluoromethylphenoxy)-2-(3'-trifluoromethylphenyl)benzene.

5. The method of claim 1, wherein the 1,4-bis(4-amino-2-trifluoromethylphenoxy)-2-(3',5'-trifluoromethylphenyl) benzene is prepared following the procedure, comprising: reacting 3-methylphenylbisphenol 2-chloro-5-nitro-3-trifluorotoluene in toluene in the presence of anhydrous potassium carbonate and N,N-dimethylformamide, to give a dinitro monomer; and allowing the dinitro monomer to react in an aqueous ethanol solution in the presence of Fe and hydrochloric acid, to yield 1,4-bis(4-amino-2-trifluoromethylphenoxy)-2-(3',5'-trifluoromethylphenyl)benzene.

6. The method of claim 1, wherein the 1,4-bis(4-amino-2-trifluoromethylphenoxy)-2-(3'-methylphenyl)benzene can be prepared following the procedure, comprising:
   reacting 3,5-bis(trifluoromethyl)phenylbisphenol with 2-chloro-5-nitro-3-trifluorotoluene in toluene in the presence of anhydrous potassium carbonate and N,N-dimethylformamide, to give a dinitro monomer; and allowing the dinitro monomer to react in an aqueous ethanol solution in the presence of Fe and hydrochloric acid, to yield 1,4-bis(4-amino-2-trifluoromethylphenoxy)-2-(3'-methylphenyl)benzene.

7. The method of claim 4, wherein the molar ratio of trifluoromethylbisphenol to 2-chloro-5-nitro-3-trifluorotoluene is 1:2.

8. The method of claim 4, wherein the molar ratio of the dinitro monomer to Fe is 1:12, and the aqueous ethanol solution is 50% by volume.

9. The method of claim 5, wherein the molar ratio of 3-methylphenylbisphenol to 2-chloro-5-nitro-3-trifluorotoluene is 1:2.

10. The method of claim 6, wherein the molar ratio of 3,5-bis(trifluoromethyl)phenylbisphenol to 2-chloro-5-nitro-3-trifluorotoluene is 1:2.

11. The method of claim 5, wherein the molar ratio of the dinitro monomer to Fe is 1:12, and the aqueous ethanol solution is 50% by volume.

12. The method of claim 6, wherein the molar ratio of the dinitro monomer to Fe is 1:12, and the aqueous ethanol solution is 50% by volume.

13. A liquid crystal alignment film prepared according to the method of claim 1, which is formed by at least one layer of monomolecular polyimide film.

14. A display substrate, comprising the liquid crystal alignment film of claim 13.

* * * * *